United States Patent
Räisänen et al.

(10) Patent No.: US 6,577,648 B1
(45) Date of Patent: Jun. 10, 2003

(54) METHOD AND APPARATUS FOR DETERMINING VOIP QOS CHARACTERISTICS OF A NETWORK USING MULTIPLE STREAMS OF PACKETS AND SYNCHRONIZING MEASUREMENTS OF THE STREAMS

(75) Inventors: Vilho Räisänen, Helsinki (FI); Jari Rosti, Espoo (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/411,311

(22) Filed: Oct. 4, 1999

(51) Int. Cl.[7] .................................................. H04J 3/06
(52) U.S. Cl. ...................... 370/503; 370/352; 370/353; 370/354; 370/395.2; 370/395.21; 370/395.42; 370/469; 370/473; 370/509; 370/400
(58) Field of Search .............................. 370/230, 237, 370/248, 400, 395.2, 395.21, 395.42, 503, 469, 473, 504–520, 352–354

(56) References Cited

U.S. PATENT DOCUMENTS

| | | | | |
|---|---|---|---|---|
| 5,477,531 A | * | 12/1995 | McKee et al. | 370/249 |
| 5,566,180 A | * | 10/1996 | Eidson et al. | 370/473 |
| 5,649,110 A | * | 7/1997 | Ben-Nun et al. | 370/351 |
| 5,652,749 A | * | 7/1997 | Davenport et al. | 370/466 |
| 5,790,171 A | * | 8/1998 | Klopfer et al. | 725/147 |
| 6,058,102 A | * | 5/2000 | Drysdale et al. | 370/252 |
| 6,072,809 A | * | 6/2000 | Agrawal et al. | 370/503 |
| 6,252,891 B1 | * | 6/2001 | Perches | 370/503 |
| 6,259,677 B1 | * | 7/2001 | Jain | 370/252 |
| 6,324,170 B1 | * | 11/2001 | McClennon et al. | 370/286 |
| 6,360,271 B1 | * | 3/2002 | Schuster et al. | 709/231 |
| 6,366,959 B1 | * | 4/2002 | Sidhu et al. | 709/231 |
| 6,466,550 B1 | * | 10/2002 | Foster et al. | 370/261 |

FOREIGN PATENT DOCUMENTS

WO 9813966 4/1998

OTHER PUBLICATIONS

Y. Kume, "Improvement of Spatial Resolution Properties of Image Intensifier–TV Digital Systems with a Multiple–Narrow–Slit Beam Imaging Technique", Medical Physics, vo. 15, No. 6, Nov./Dec. 1988, pp. 846–852.

A. Larsen, All Eyes on IP Traffic, Data Communications, Mar. 21, 1997, pp. 54–62.

V. Paxson, "End–To–End Internet Packet Dynamics", IEEE/ACM Transactions on Networking, vol. 7, No. 3, Jun. 1999, pp. 277–292.

* cited by examiner

Primary Examiner—David Vincent
Assistant Examiner—Van Nguyen
(74) Attorney, Agent, or Firm—Antonelli, Terry, Stout & Kraus, LLP

(57) ABSTRACT

A method and apparatus for determining Voice Over Internet Protocol (VoIP) Quality of Service (QoS) characteristics of a network using multiple streams of packets. Measurements obtained using the multiple streams of packets are synchronized relative to each other to permit VoIP, QoS characteristics of parts of a network to be reliably determined.

2 Claims, 3 Drawing Sheets

| C | $\eta^m_{L1}$ | $\delta^m_{L1}$ | $d^m_{L1}$ | $\eta^m_{PC}$ | $\delta^m_{PC}$ | $d^m_{L1}$ |
|---|---|---|---|---|---|---|
| 0 | 0 | 0 | 50 | 0.98 | 12.6 | 50 |
| 1 | 0.22 | 0.49 | 50 | 1.00 | 12.5 | 50 |
| 2 | 0.45 | 0.70 | 50 | 1.02 | 12.3 | 50 |
| 5 | 1.16 | 0.85 | 50 | 1.07 | 11.6 | 50 |
| 10 | 2.42 | 0.93 | 50 | 1.18 | 9.0 | 50 |
| 20 | 5.32 | 0.97 | 50 | 1.41 | 6.1 | 50 |
| 40 | 13.20 | 0.99 | 50 | 2.06 | 3.9 | 50 |

TABLE 1: EFFECT OF NOISE ON CORRELATION QUANTITIES

US 6,577,648 B1

METHOD AND APPARATUS FOR DETERMINING VOIP QOS CHARACTERISTICS OF A NETWORK USING MULTIPLE STREAMS OF PACKETS AND SYNCHRONIZING MEASUREMENTS OF THE STREAMS

BACKGROUND OF THE INVENTION

The present invention relates to a method and apparatus for determining Voice Over Internet Protocol (VoIP) Quality of Service (QoS) characteristics of a network using multiple streams of packets, wherein measurements obtained as a result of the multiple streams of packets are synchronized relative to each other to permit the QoS characteristics of parts of a network to be reliably determined.

Voice or telephony services can now be provided over a packet switched network, such as the Internet. These packet switched networks are commonly referred to as Internet Protocol (IP) networks. Delivery of telephony in IP-based networks is called voice over IP (VoIP), because the Internet Protocol according to various IP based standards is the primary bearer protocol used. One such IP based standard, for example, is the International Telecommunication Union (ITU) H.323 Standard which provides a foundation for audio, video and data communications across IP networks.

VoIP is a cost effective means of transporting digitized audio signals. However, in order to provide VoIP minimum guarantees must be met where packets containing the audio signals will arrive within a set delivery time and will not be discarded due to queue overflows. For example, some audio and video "play-back" applications are intolerant of any packets arriving after play-back time. Further, some applications have hard realtime requirements in order to operate properly. Thus, the ability to provide at least some kind of guaranteed services is needed. These guaranteed services are provided in packet switched networks in the form of Quality of Service (QoS).

The original IP standard provides no QoS support in the form of limits in packet delivery delay or lost packets. Accordingly, variations in end-to-end packet queuing delays and lost or discarded packets can occur due to changing network conditions. To remedy this, QoS standards have been proposed such as Differentiated Services (DiffServ) standards disclosed in "Definition of the Differentiated Services Field (DS Field) in the IPv4 and IPv6 Headers" by K. Nichols et al, RFC 2474, Network Working Group, IETF, December 1998 and "An Architecture for Differentiated Services" by S. Blake et al, RFC 2475, Network Working Group, IETF, December 1998. Also QoS standards have been proposed such as Integrated Services (IntServ) Standards as disclosed in "General Characterization Parameters for Integrated Service Network Elements" by S. Shenker et al, RFC 2215, Network Working Group, IETF, September 1997. When the QoS for a data stream is guaranteed, limits can be set on end-to-end delays and packet loss. Further, the over provisioning of network resources in small scale applications can be avoided.

Whatever method of providing guaranteed QoS for VoIP is used, measurements are an invaluable tool in determining whether the QoS guarantees are being met. This is especially true for IP networks in which data and voice streams co-exist.

Various methods have been proposed for measuring QoS characteristics in packet switched networks. Such measurements have been performed to address issues like router stability, distribution of end-to-end delays and lost packet rates. These proposed methods are primarily concerned with measuring QoS characteristics on a single stream of packets such as that illustrated in FIG. 1, wherein a sending host 101 and a pinging host 102 are provided.

As shown in FIG. 1 the sending host 101 sends a (single) stream of packets across the packet switched network 103. Prior to sending, the sending host 101 adds information to each of the packets. The stream of packets sent by the sending host 101 is received by the pinging host 102. The pinging host 102 adds information to each of the packets and returns the packets to the sending host 101 across the packet switched network 103. Thus, the system illustrated in FIG. 1 allows for round trip measurements of QoS characteristics to be performed. The round trip measurements have the advantage of avoiding complications arising from the synchronization of the of the clocks applied to the sending host 101 and the pinging host 102, and providing an efficient emulation of real full-duplex VoIP conversations.

An example of the format of a packet used in a round trip measurement of QoS characteristics is illustrated in FIG. 2. The packet 200 as illustrated in FIG. 2 has various fields for storing information added to the packets by each of the hosts. For example, fields 201 and 202 store time stamp data $TS_1$ and packet sequence number data $SEQ_1$ respectively. The $TS_1$, and $SEQ_1$ data are entered by the sending host 101 prior to sending the packet 200. Fields 203 and 204 store time stamp data $TS_2$ and packet sequence number data $SEQ_2$ respectively. The $TS_2$ and $SEQ_2$ data are entered by the pinging host 102 when returning the packet to the sending host 101. The pinging host 102 returns the packet 200 to the sending host 101. Field 205 stores time stamp data $TS_3$ which is entered by the sending host 101 upon receipt of the packet 200 returned by the pinging host 102 to indicate the time the packet 200 completed its round trip.

By use of the above described information stored in the fields of the packet 200 having completed the round trip, QoS characteristics of the portion of the network upon which the packet completed the round trip can be determined. QoS characteristics of the portion of the packet switched network are at acceptable levels when limits such as end-to-end delay and packet loss are not exceeded.

A high end-to-end delay lowers the QoS characteristics of the stream of packets as experienced by an end user. A "high quality" QoS may set end-to-end delay to be less than 250 ms, whereas "best" QoS may set end-to-end delay at 150 ms. Delays exceeding a target value might be interpreted as losses, resulting in "limited delay". Jitter, or variation of packet inter-arrival times at-the receiving host is important for receiver play-back buffer dimensioning. Thus, determining a value of jitter is important. The effects of packet loss on QoS is more complexed. A tolerable packet loss rate depends on the coder/decoder (CODEC) used since such a CODEC may employ QoS counter-measures such as Forward Error Correction (FEC). An important factor affectin QoS of a packet stream is the correlation of losses which are measured as conditional loss probability distribution $clp(\eta)$ (i.e., the set of probabilities $P(\eta)$ that n adjacent packets are lost) and scalar conditional lost probability $clp$ (i.e., the probability that the loss of a packet is followed by another).

Thus, the measurement of QoS characteristics determined based on the information stored in the fields of packets that have completed the round trip may include average delay-limit Round Trip Time (RTT) delay $(dr_l)$, delay-limited loss $(l_l)$, jitter $(j)$ and average length of sequences of lost packets $(plg)$. The term "delay-limited" loss $l_l$ refers to packets exceeding a certain limit, for example, 250 ms. Such packets are counted as losses and ignored in computing $dr_1$.

The above described method of calculating QoS characteristics using a single stream of packets suffers from various disadvantages. For example, performing measurements on a single stream of packets in a network is not a reliable measure of the QoS experienced by various users in various parts of the network. Since only a single stream of packets is used for measuring QoS characteristics, the measurements are only relevant for the portion of the network upon which the stream of packets perform the round trip. Further, the QoS characteristics may be affected in different ways in other parts of the network.

Further, co-located measurements when the sending hosts are located in one part of the network and pinging hosts are located in another part of the network yield more reliable information. In such an arrangement, QoS characteristics of different parts of the entire network or in different parts of a portion of the network can be performed. Such is not possible when a single stream of packets is used.

Therefore, a reliable method for determining QoS characteristics of various portions of a network experienced by many users is desired. Further, it is desired to be able to correlate the measured QoS characteristics of various portions of the network to each other to aid in evaluating the QoS characteristics of the entire network. The same method can be used to obtain more reliable data for a single part of a network as well.

SUMMARY OF THE INVENTION

The present invention provides a method and apparatus for determining Voice Over Internet Protocol (VoIP), Quality of Service (QoS) characteristics of a network using multiple streams of packets, wherein measurements obtained using the multiple streams of packets are synchronized relative to each other to permit the VoIP, QoS characteristics of the network-to be reliably determined.

Accordingly, the present invention provides a method and apparatus of determining. QoS characteristics of a network using a plurality of streams of packets. In the present invention, each of a plurality of measuring hosts sends a stream of packets to a corresponding one of a plurality of receiving hosts. Each packet of the stream of packets being sent from the measuring host includes first time information added by the measuring host indicating the time the packet was sent from the measuring host. The stream of packets sent from the measuring host is received by the corresponding receiving host and is immediately returned to the measuring host. Each packet of the stream of packets being returned by the receiving host includes second time information added by the corresponding receiving host indicating the time the packet was returned.

The stream of packets returned by the corresponding receiving host are received by the measuring host. The measuring host adds to each packet of the stream of packets returned by the corresponding receiving host third time information indicating the time the packet completed a round trip from the measuring host to the corresponding receiving host and back.

The plurality of streams of packets received by the plurality of measuring host provide a plurality of streams of measurement information, (time series data) related to the first, second and third time information. The streams of time series data are synchronized to each other during an analysis phase taking place after the measurements.

The first, second and third time information included in each packet of each of the plurality of streams of packets provides streams of time series data useful in determining the QoS characteristics of the network. Synchronization of the streams of time series data is achieved in the analysis phase by displacing each member of a pair of streams of time series data relative to each other until a common phenomenon occurring in each member of each pair of streams match in the time direction. The common phenomenon may be any event that simultaneously effects the quality of all streams of packets. Once the streams of time series data have been synchronized to each other, QoS characteristics of the measured part of the network can be accurately and reliably determined. Determining QoS characteristics based on the synchronized streams of time series data provides a reliable measure of the QoS provided to various users located in different parts of the network. On the other hand, by making multiple measurements from a single location more accurate information can be obtained.

The above described first, second and third time information is particularly useful in determining delays that may exist in the network. Other information can also be added to the packet by the measuring and receiving hosts as the streams of packets traverse the round trip from the measuring host to the receiving host and back. Such information could, for example, be packet sequence numbers which sequentially identify the sequential location of each of packet in the streams of packets. Packet sequence numbers are useful in providing a means to measure packet loss.

It should be noted that each of the measuring and receiving hosts can, for example, be arranged to be at the network boundaries and can be either a router or a proxy server. Further, each of the measuring hosts rather than sending a stream of packets each having the format described above can, for example, send a stream of packets which includes real traffic. The corresponding receiving host upon receipt of the stream of packets including the real traffic forwards the stream of packets toward its final destination and sends back (reflect) a copy of the stream of packets including the real traffic to the measuring host. Each of the packets of the stream of packets including real traffic can be extended in a manner to include information corresponding to the time and sequence number information described above for measurement purposes.

BRIEF DESCRIPTION OF THE DRAWINGS

The present invention will be more apparent from the following detailed description, when taken in conjunction with the accompanying drawings, in which.

DETAILED DESCRIPTION OF THE INVENTION

Features of the present invention are illustrated and will be described with respect to FIGS. 2–7.

The present invention provides a method and apparatus for determining QoS characteristics of parts of a network using a plurality of streams of packets, wherein streams of measurement information (streams of time series data) obtained as a result of the plurality of streams of packets are synchronized relative to each other to permit the QoS characteristics of the entire network to be reliably determined.

Figure 1:
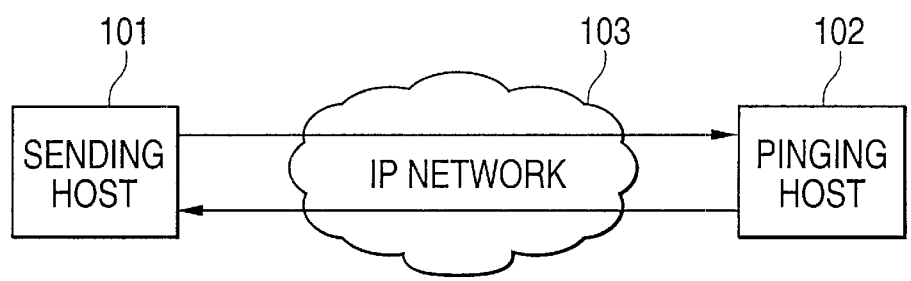
FIG. 1 is a schematic diagram illustrating a conventional method of detecting QoS characteristics using a single stream of packets.
Figure 2:
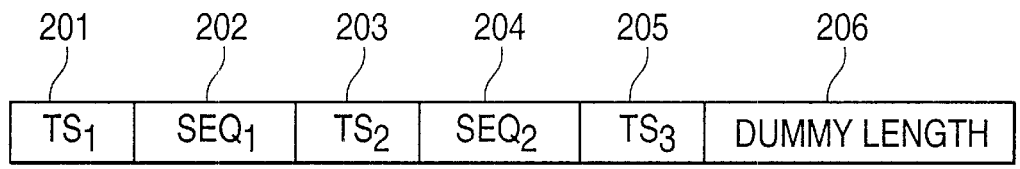
FIG. 2 is a schematic diagram illustrating the format of each packet of a stream of packets used in measuring QoS characteristics of a network.
Figure 3:
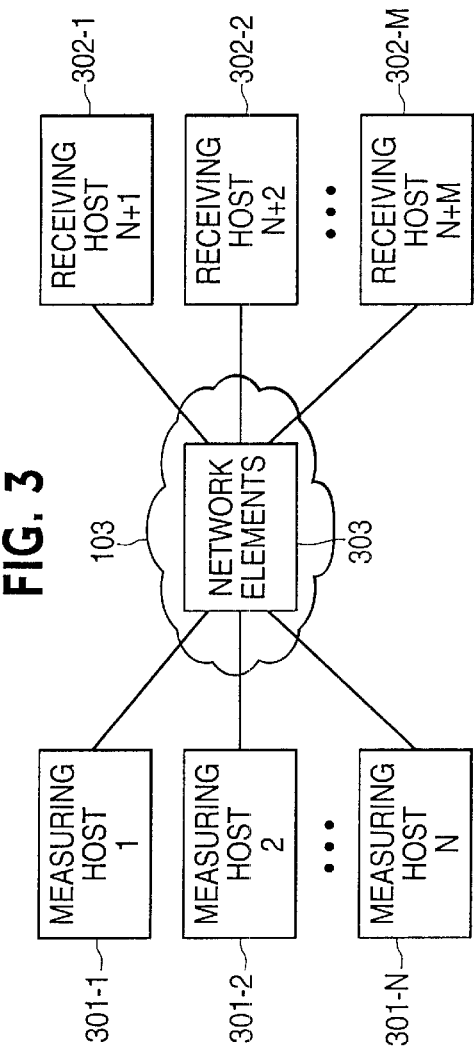
FIG. 3 is a schematic diagram illustrating the arrangement used for applying multiple streams of packets to a network to determine QoS characteristics.
Figure 4:
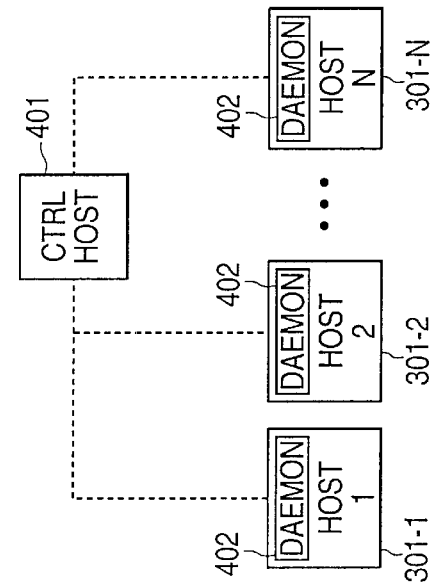
FIG. 4 is a schematic diagram illustrating the arrangement for controlling a plurality of measuring hosts for sending the plurality of streams of packets.

The present invention provides apparatus such as that illustrated in FIGS. 3 and 4. The apparatus includes a plurality of measuring hosts 301-1 through 301-n and a plurality of receiving hosts 302-1 through 302-m. Each measuring host 301 sends a stream of packets through network elements 303 of the packet switched network 103 to a corresponding receiving host 302. Each packet of the stream of packets sent by the measuring host 301 includes at least first time information $TS_1$ and first packet sequence number information $SEQ_1$ and possibly dummy length information such as that illustrated and previously described with respect to FIG. 2. The first time information $TS_1$ is a time stamp indicating the time the packet was sent from the measuring host 301. The packet sequence number information $SEQ_1$ indicates the sequential location of the packet in the stream of packets being sent by the measuring host 301.

The stream of packets sent from the measuring host 301 travels through the network elements 303 of the packet switched network 103 to the receiving host 302. Each of the measuring hosts 301 may be positioned at various locations in the packet switched network 103 so that the QoS characteristics determined for the network is representative of QoS characteristics of the entire network, allowing for comparison of QoS characteristics in different parts of the network. Alternatively, the measuring hosts 301 can be co-located in one part of the network and the receiving hosts 302 in another part of the network allowing for acquisition of multiple samples of QoS characteristics in a portion of the network. Thus, measurement taken in this manner yield measurement results that are more reliable.

The stream of packets sent by the measuring host 301 and traveling through the network elements 303 in the packet switched network 103 are received by a corresponding receiving host 302. The corresponding receiving host 302 adds second time information $TS_2$ and second packet sequence number information $SEQ_2$ to each of the packets of the packet stream and returns the stream of packets to the measuring host 301 via the network elements 303 of the packet switched network 103. The second time information $TS_2$ is a time stamp which indicates the time the packet is being returned to the measuring host 301. The second packet sequence number information $SEQ_2$ provides an indication of the sequential location of the packet in the stream of packets.

The stream of packets returned by the corresponding receiving host 302 and having traveled through the network elements 303 of the packet switched network 103 is received by the measuring host 301. The measuring host 301 adds to each packet of the stream of packets third time information $TS_3$, a time stamp, indicating the time the packet completed the round trip from the measuring host 301 to the corresponding receiving host 302 and back.

It should be noted that any other type information that would aid in determining QoS characteristics of the network can be added by the measuring and receiving hosts to each packet of the stream of packets as it travels from the measuring host 301 to the receiving host 302 and back. Further, the size of each packet of the stream of packets and the transmission frequency of the packets in each of the streams of packets can be set in a manner so as to aid in determining QoS characteristics of the network for a particular CODEC.

The first, second and third time information, the first and second packet sequence number information and any other information added to the packets of the streams of packets that have completed the round trip provides measurement information regarding different characteristics of the network elements 303 of the packet switched network 103. Thus, the arrangement of measuring host 301 and receiving host 302 as illustrated in FIG. 3 provides a plurality of streams of measurement information (streams of time series data) which are used to determine the QoS characteristics of the entire network. However, in order for these streams of time series data to be effective in determining the QoS characteristics of the network, the streams of time series data must be synchronized relative to the each other. A description of the features of the present invention with respect to the analysis and synchronization of the streams of time series data obtained from the streams of packets that have completed a round trip is provided below.

One of the goals in designing the apparatus of the present invention having a plurality of measuring and receiving hosts is to cause as little disturbance to the measurement process as possible. In other words, the measurements used to determine QoS characteristics of the network should not be effected-by host synchronization traffic. Another goal in designing the apparatus of the present invention is that when performing analysis with respect to the plurality of streams of time series data provided by the streams of packets to determine QoS characteristics, a high degree of synchronization between the streams of time series data is desirable.

In order to accomplish the above stated goals, the present invention provides a control structure for the plurality of measuring hosts 302 in the manner as illustrated in FIG. 4.

As per in FIG. 4, each measuring host 301 is connected to a controlling host 401 which controls the initiation and types of measurements to be conducted by the measuring host 201. The controlling host 401 also performs processes to determine whether the connections between the controlling host 401 and the measuring hosts 301 are properly configured and have not failed. The controlling host 401 controls operation of each of the measuring hosts 301 by the use of a Linux Daemon process 402 which is executed in each of the measuring hosts 301. (Linux is a computer operating system). It should be noted that any type of process can be used so long as the process provides the desired results.

Figure 5:
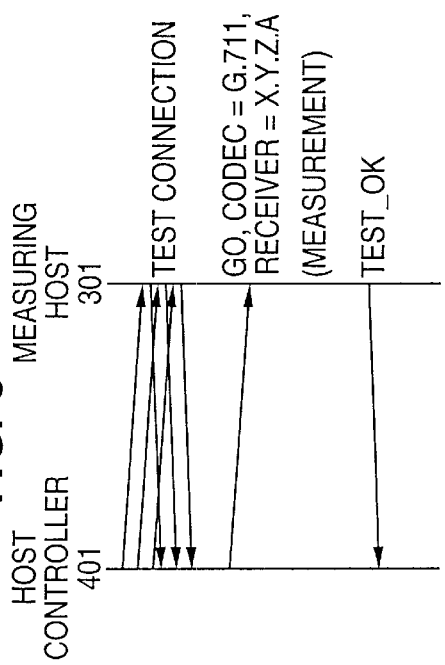
FIG. 5 is a signaling diagram illustrating the signaling between the controlling host and one of the measuring hosts.

In each measuring host 301, the daemon process 402 listens to a Transmission Control Protocol (TCP) socket for commands from the controlling host 401. As illustrated in FIG. 5, measurements in each of the measuring hosts 302 are initiated in response to the controlling host 401 broadcasting or sending individually a "GO" command to the daemon process 402 resident in each of the measuring hosts 301 via a socket connection. Upon receipt of the GO command, each measuring host 301 begins transmission of a stream of packets to a corresponding receiving host 302 via the network elements 303 of the packet-switched network 103. The process of sending the stream of packets from each measuring host 301 is conducted in the manner described above, wherein first time and packet sequence number information $TS_1$ and $SEQ_1$, respectively, are added by the measuring host 301 to each packet prior to transmitting the stream of packets, the receiving host 302 upon receipt of the stream of packets returns the stream of packets such that each packet has added by the receiving host 302 second time and packet sequence number information $TS_2$ and $SEQ_2$, respectively, and upon receipt of the returned stream of packets by the measuring host 301 each packet has added thereto third time information $TS_3$. In each measuring host 302, upon completion of the test consisting of the stream of packets, a "Test Ok" signal is sent to the controlling host 401.

It should be noted that with respect to the GO command, the controlling host 401 sends measurements parameters to the measuring hosts 302 such as, for example, the number of packets to be transmitted as part of the stream of packets, the transmission frequency of the packets of the streams of packets, etc. Thus, the controlling host 401 knows how long a measurement takes in each of the measuring hosts 301. Once a measurement in a measuring host 301.has been completed, then a "Test OK" signal is sent to the controlling host 401. If the "Test OK" signal has not been received beyond a certain period of time corresponding to how long such measurements take, then the controlling host 401 determines that an error or fault has occurred and issues a fault indication.

One of the important features of the arrangement of the present invention as illustrated in FIGS. 3 and 4 is to provide apparatus which coordinates the simultaneous performance of measurements by a plurality of measuring host each performing operations with respect to different streams of data. However, as described above QoS characteristics of a network can be reliably and accurately determined when the plurality of streams of measurement information resulting from the plurality of streams of packets are synchronized with respect to each other. The synchronization of the plurality of measurement information is a based on a correlation of the plurality of streams of measurement information so that a common phenomenon effecting the QoS characteristics of each of the streams of packet are matched to each other.

When estimating QoS characteristics of a network, it is important to be able to differentiate between events effecting only a single stream of packets and events which simultaneously effect the QoS characteristics of all of the streams of packets. Events which affect only a single stream of packets may, for example be errors in the operation of Network Interface Cards (NIC) in a Local Area Network (LAN). Events which may simultaneously effect the QoS characteristics of all streams may, for example, be when the queue of a router in the packet switched network becomes full thereby discarding any subsequent packets which may have been routed to the router.

By detecting when events occur that simultaneously effect the QoS characteristics of all of the streams of data, it becomes possible to synchronize the streams of measurements information relative to each other so that the streams of measurement information can be properly analyzed to determine QoS characteristics of the entire network. Events which simultaneously effect QoS characteristics in all of the streams of data can be highlighted by calculating correlation information indicating the degree of correlation between members of a pair of streams of measurement information. The higher the correlation information value the higher the degree of information between the members of the pair of streams of measurement information. Calculating the correlation information essentially involves displacing the members of each pair of streams of measurement information relative to each other until a match occurs in the time direction of an event that simultaneously the QoS of all streams of packets are matched in the timed direction. A low correlation information value indicates that the events effecting both members of the pair of streams of measurement information has not been matched in the timed direction. A high correlation information value indicates that the event which effect the QoS of each of the members of the pair of streams of information have been matched in the timed direction, thereby indicating synchronization of the streams of measurement information.

When comparing two streams of measurements information, both dilation (CPU clocks rates of the host differ) and displacement (measurements start at different times) between streams of measurements information are possible. Hence, the following requirements can be placed for a method for measuring degree of synchronization of QoS characteristics between different streams of measurements information:

Method to detect dilation.

Method for synchronizing different delay traces.

Method must be robust against measurement noise and random delay peaks.

In tests performed using a small selection of Intel i586/i686 based Linux Hosts, the maximum observed clock skew was of the order of 0.15 promilles. This translates to roughly a difference of a single voice frame length per 6000 frames.

Dilation, or clock skew of the clock of a host relative to that of another host, can be detected by having both the measuring host and receiving host to mark a packet i of a test stream of packets with a time stamp denoted by $ts_m^1$ and $ts_r^1$, respectively. As the clocks of the two host need not be synchronized, the quantity $\Delta t^i = ts_r^i - ts_m^i$ is not necessarily meaningful in determining clock skew. However, the change of $\Delta ts^i$ with respect to sequence number corresponds to clock skew (c), as defined by the differential equation below:

$$c = \frac{d\Delta_i}{di} \quad (1)$$

Analyzing each stream of measurement information using the first and second time information provided by first and second time stamps which corresponds to $ts_m^i$ and $ts_r^i$ respectively allows for a determination of clock skew which can be used to aid in synchronizing respective streams of measurement information.

According to the above, in order to calculate correlation information displacement of two streams of measurement information must be conducted. Finding the displacement of two streams of measurement information involve comparing time information of the two streams of measurement information relative to each other. It should be noted that no assumption about spectral structure of the streams of measurement information is made. This is due to the random nature of QoS characteristics in networks when the capacity of the transfer channels are efficiently used. Thus, methods related to spectral decomposition may be deemed inappropriate with respect to the calculation necessary for the present invention.

The comparison of the two streams of measurement information can be approached from at least two different directions. From one direction, the properties of the differences between the two streams of measurement information $s_2 - s_1$ can be studied. In the other direction, variations in the mean values in the two streams of measurement information $s_1$ and $s_2$ can be interrelated. Both approaches will be discussed below.

The first correlation quantity is a normalized (L1) correlation of differences between the two streams of measurement information (time series data) $s_1$ and $s_2$ or the average absolute value of differences between the two streams of time series data as a function of displacement d as defined below. Use of L1 instead of a more general Ln is due to the goal of providing robustness toward random differences between the two streams of time series data.

$$n_{LI}(d) = \frac{1}{m}\sum_{i=l_1}^{l_2} \left\| \frac{s_1(i)}{\bar{s}_1} - \frac{s_2(i+d)}{\bar{s}_2} \right\| \quad (2)$$

In the above equation, $l_1$=max $(0,d)$ $l_2$=min $(\eta,\eta+d)$ and $m=l_2-l_1+1$ where $\eta$ is the smaller of the lengths of the two streams of time series data. $\bar{s}_1$ and $\bar{s}_2$ are used to denote average values of the streams of time series data.

The second correlation quantity is an average pair correlation (PL) of the two streams of time series data as defined below:

$$n_{PC}(d) = \frac{1}{m}\sum_{i=l_1}^{l_2} = l_1\left(\frac{s_1(i)}{\bar{s}_1} - 1\right)\left(\frac{s_2(i+d)}{\bar{s}_2} - 1\right) \quad (3)$$

Figures 6, 7:
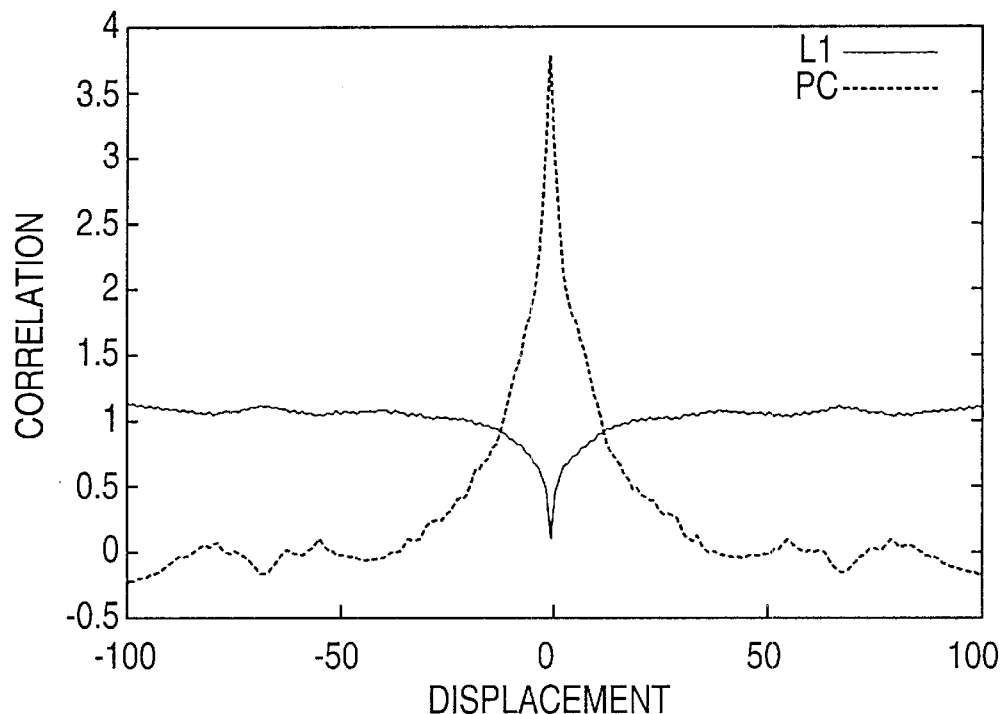
FIG. 6 is a chart graphically illustrating maximum and minimum correlation quantities with respect to displacement for two streams of time series data.
FIG. 7 provides a table which includes quantitative information as to the effect of noise on correlation quantities.

If the streams of time series data are correlated, the optimal displacement shows up as a global minimum in $\eta_{L1}$ and as a maximum in $\eta_{PC}$. For a case of a pure signal having no noise in the measurement, there-is a discontinuity in the derivative $dn_{L1}/dd$. An actual example of two correlation quantities in a real network is illustrated in FIG. 6.

The correlation quantities often display minima and maxima even when calculated for a non-optimal value of displacement d. The use of multiple synchronization measures provides a check against random phenomena. Firstly, the numerical values of $\eta_{L1}$ and $\eta_{PC}$ indicate the degree of correlation. Secondly, the proximity of displacements corresponding to the maximal correlations for the two quantities provides another indication of the degree of correlation.

The robustness property of the synchronization methods described above was tested using two discrete streams of time series data $s_1(t)$ and $s_2(t)$ ($t\in[1,N]$). The signals include peaks, with the latter signal deliberately displaced with respect to the former:

$$s_1(t) = A\left[1 + Bp(t)C\left(n - \frac{1}{2}\right)\right] \quad (4)$$

$$s_2(t)=1+Bp(t+d) \quad (5)$$

According to the above, $p(t)$ is controlled by a random variable where $p(t)=1$ if random variable $\chi>0.99$. Both $\chi$ and $\eta$ are white noise random variables picked from the range [0,1].

In the test cited below, values A=2, B=10 and d=50 were used with varying C (noise-to-signal ratio). The results set forth in Table 1 of FIG. 7 show that the correct displacement value can be found even with high noise levels. On the other hand, the value $\eta_{L1}$ and $n_{PC}$ varies depending on noise, which is why it was found useful to compare the values of the two quantities corresponding to the "optimal" displacement to a range of variation of the quantity in question. Average value and Standard deviation of $n_{L1}$ is denoted as $\bar{n}_{L1}$ and $<n_{L1}>$, respectively, and the average value and stand deviation of $\eta_{PC}$ is denoted as $\bar{n}_{PC}$ and $<n_{PC}>$ respectively. Further, the correlation values related to "optimal" displacement $$d_{LI}^m$$

and $$d_{PC}^m$$

(as determined by the minimum of $n_{L1}$ and the maximum of $n_{PC}$ by $$n_{LI}^m$$

and $$n_{PC}^m.$$

Then, the following robust quantities may be defined as:

$$\delta_{LI}^m = \frac{n_{LI}^m}{\bar{n}_{LI} + \langle n_{LI}\rangle} \quad (6)$$

$$\delta_{PC}^m = \frac{n_{PC}^m}{\bar{n}_{PC} + \langle n_{PC}\rangle} \quad (7)$$

$$\delta_{LI}^m$$

and $$\delta_{LI}^m$$

are measures of the signal-to-noise ratio of depth of the smallest minimum (resp. height of the largest maximum) of $n_{L1}$ (resp. $n_{PC}$).

Another part of multi-stream QoS measurements is to study whether all streams suffer equal QoS degradations. In laboratory tests, the following two quantities have been found to be good measures for QoS fairness between the streams:

1. Fairness with respect to loss rate. Here the delay-limited loss rate $l_l$ is calculated for each stream i individually. Fairness index is calculated for the collection of the individual loss rates. The fairness index is defined as $$f = \frac{\left(\sum_{i=1}^{N} l^i\right)^2}{N \cdot \sum_{i=1}^{n} (l_l^i)^2} \quad (8)$$

Values of fairness index close to zero indicate a large variation between magnitudes of individual $l_l^i$'s, whereas values close to unity indicate that the compared quantities are very close to each other.

2. Standard deviation of the loss rate over all the streams, $<l^i_l>$.

Similar techniques can be applied also to other QoS characteristics, (e.g., to average delays).

It should be noted that each of the measuring and receiving hosts can, for example, be arranged to be at the network boundaries and can be either a router or a proxy server. Further, each of the measuring hosts rather than sending a stream of packets each having the format described above can, for example, send a stream of packets which includes real traffic. The corresponding receiving host upon receipt of the stream of packets including the real traffic forwards the stream of packets toward its final destination and sends back (reflect) a copy of the stream of packets including the real traffic to the measuring host. Each of the packets of the stream of packets including real traffic can be extended in a manner to include information corresponding to the time and sequence number information described above for measurement purposes.

Therefore, based on the above, the present invention provides a method and apparatus for determining VoIP QoS characteristics of a network using multiple streams of packets. Particularly, the present invention provides a method and apparatus that synchronizes the initiation of measurements performed by a plurality of measuring hosts using multiple streams of packets and synchronizes multiple streams of measurement information obtained by the measuring hosts based on the multiple streams of packets. In the present invention, by use of the synchronized streams of measurement information VoIP QoS characteristics of the entire of network or portions thereof can be determined.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of determining Quality of Service (QoS) characteristics of a network using a plurality of streams of packets, comprising the steps of:

sending from each of a plurality of measuring hosts to a corresponding receiving host a stream of packets, each packet including first time information added by said measuring host indicating the time the packet was sent from said measuring host;

receiving in each of a plurality of receiving hosts from a corresponding measuring host the stream of packets sent by the corresponding measuring host;

returning from each of said receiving hosts the received stream of packets, each packet being returned including second time information added by said receiving host indicating the time the packet was returned;

receiving in each of said measuring hosts the stream of packets returned by said receiving host and adding third time information to each packet of the stream of packets returned by said receiving host indicating the time the packet completed a round trip from said measuring host to said receiving host and back;

generating measurement information based on the returned plural streams of packets received in the measuring hosts, said measurement information including a plurality of streams of time series data each related to one of the returned plural streams of packets;

synchronizing said streams of time series data relative to each other based on an occurrence of an event effecting each of the streams of packets, said synchronizing including displacing said streams of time series data relative to each other; and determining QoS characteristics of the network based on the synchronized streams of time series data.

2. A method according to claim 1, wherein the operation of the plurality of measuring hosts is synchronized in a manner so as not to effect measurements being conducted to determine QoS characteristics of the network.

* * * * *